United States Patent [19]

Pittaway

[11] Patent Number: 4,544,869
[45] Date of Patent: Oct. 1, 1985

[54] ELECTRONIC CONTROL CIRCUIT FOR BI-DIRECTIONAL MOTION

[75] Inventor: James W. Pittaway, Anaheim, Calif.

[73] Assignee: Unisen, Inc., Irvine, Calif.

[21] Appl. No.: 539,281

[22] Filed: Oct. 5, 1983

[51] Int. Cl.[4] .............................................. H02P 1/22
[52] U.S. Cl. .................... 318/293; 318/257; 318/258
[58] Field of Search ............... 318/293, 563, 257, 258; 307/254, 255, 262, 270

[56] References Cited

U.S. PATENT DOCUMENTS

| | | | |
|---|---|---|---|
| 3,229,181 | 8/1963 | Evans | 318/293 |
| 4,146,801 | 3/1979 | Vali et al. | 361/33 X |
| 4,319,170 | 3/1982 | Brent | 318/376 |
| 4,319,171 | 3/1982 | Motoori | 318/293 X |
| 4,353,019 | 10/1982 | Sweeney | 318/592 X |
| 4,447,768 | 5/1984 | Terui | 318/293 |
| 4,454,454 | 6/1984 | Valentine | 318/293 |

FOREIGN PATENT DOCUMENTS 58-39288  3/1983  Japan ................................. 318/293

Primary Examiner—B. B. Dobeck
Assistant Examiner—Bentsu Ro
Attorney, Agent, or Firm—Thomas J. Plante

[57] ABSTRACT

The disclosure provides an electronic motor control circuit which switches and amplifies to control a bi-directional electric motor, using a symmetrical circuit, each half of which consists of five transistors. The circuit has a logic level input and motor driving power output using, for control in each direction: an input transistor; a control transistor turned on and off by the input transistor; two matched, complementary motor drive transistors (at opposite terminals of the motor) turned on and off simultaneously by the control transistor; and a lockout transistor, also actuated by the control transistor, which is operatively connected to one of the motor drive transistors in the other half of the system to prevent short circuiting.

14 Claims, 2 Drawing Figures

ELECTRONIC CONTROL CIRCUIT FOR BI-DIRECTIONAL MOTION

BACKGROUND OF THE INVENTION

This invention relates to electronic control circuitry designed to control bi-directional, or back-and-forth, motion of a driven element. The driving energy is supplied by an electric motor, whose clockwise and counterclockwise motion is controlled. In many instances this rotary motion is converted into reciprocating motion of the driven member by suitable means, such as a lead screw.

One of the important parameters of this invention is the capability of using logic level input voltage and current to develop sufficient power output to operate a motor which exerts substantial driving force.

Another important parameter of this invention is the requirement that motion in one direction be accompanied by "lockout" of an oppositely-acting driving signal which could cause short circuiting.

In some instances, the following truth table will be useful:

|       | A = 0                | A = 1                |
| ----- | -------------------- | -------------------- |
| B = 0 | Motor off - breaking | Motor on - reverse   |
| B = 1 | Motor on - forward   | Motor off - coasting |

In other instances, the braking option may be unnecessary, or undesirable.

There are numerous uses for such control systems. The assignee of the present invention has used such control systems in numerous driven-element-positioning machines, as disclosed in Sweeney U.S. Pat. No. 4,353,019, issued Oct. 5, 1982; and in Sweeney application Ser. Nos. 576,013, a continuation-in-part of 289,922, (now abandoned) filed Aug. 4, 1981, and Ser. No. 439,299, filed Nov. 4, 1982. In FIG. 2 of application Ser. No. 576,013 and in FIG. 2 of application Ser. No. 439,299, motor-control circuitry is shown, which is substantially more complex than the present invention, and which is shown receiving signals from "axis interface" circuits interfaced between the motor-control circuitry and the CPU.

There are various other significant uses for improved motor-control circuits of this type. For example, the assignee of the present application has incorporated the circuit of this invention in a medical device of the type which provides continuous passive motion "exercises", such as flexing of a patient's leg.

This control circuitry is designed for use in a digitally-controlled system. The transistors involved in it function in the switch mode, operating essentially in the saturation and cutoff regions. Their amplification is very substantial, but no linearity of amplifier response is required. Variations in the speed, or driving energy, of the controlled motor are accomplished by pulse-width (or pulse-frequency) modulation at the input, i.e., by duty-cycle variations.

SUMMARY OF THE INVENTION

The purpose of the present invention is to provide bi-directional control of an electric motor by means of more economical and efficient electronic circuitry than that previously available, using a minimum number of transistor elements, while providing improved functional results.

The control system is symmetrical, using identical component arrangements for each direction of motion. In each half of the control circuit, two motor-connected transistors, preferably a matched pair, one of which is NPN and the other of which is PNP, are used, respectively, to connect one terminal of the motor to the positive voltage level (the power source), and to connect the other terminal of the motor to the negative voltage level (ground). A third transistor simultaneously turns on and off the two motor-connected transistors.

A positive "lockout" of a motor-connected transistor in the other half of the circuit is provided by a fourth transistor, which is also under control of the third transistor.

In order to convert from the logic level voltage input of approximately 5 volts to an operating voltage of, say, 30 volts, a fifth transistor in each half of the control circuit is used to control the third transistor. This fifth transistor switches the third transistor, and converts from low level input voltage to output level voltage.

The entire function of using logic level input (e.g., 2.5 milliwatts) to provide motor drive output (e.g., 100 watts) is accomplished with a ten-transistor circuit, five associated with each direction of motion. Additionally, the power requirements, both in the off-state and in the on-state, are minimized.

DETAILED DESCRIPTION OF PREFERRED EMBODIMENT

Figure 1:
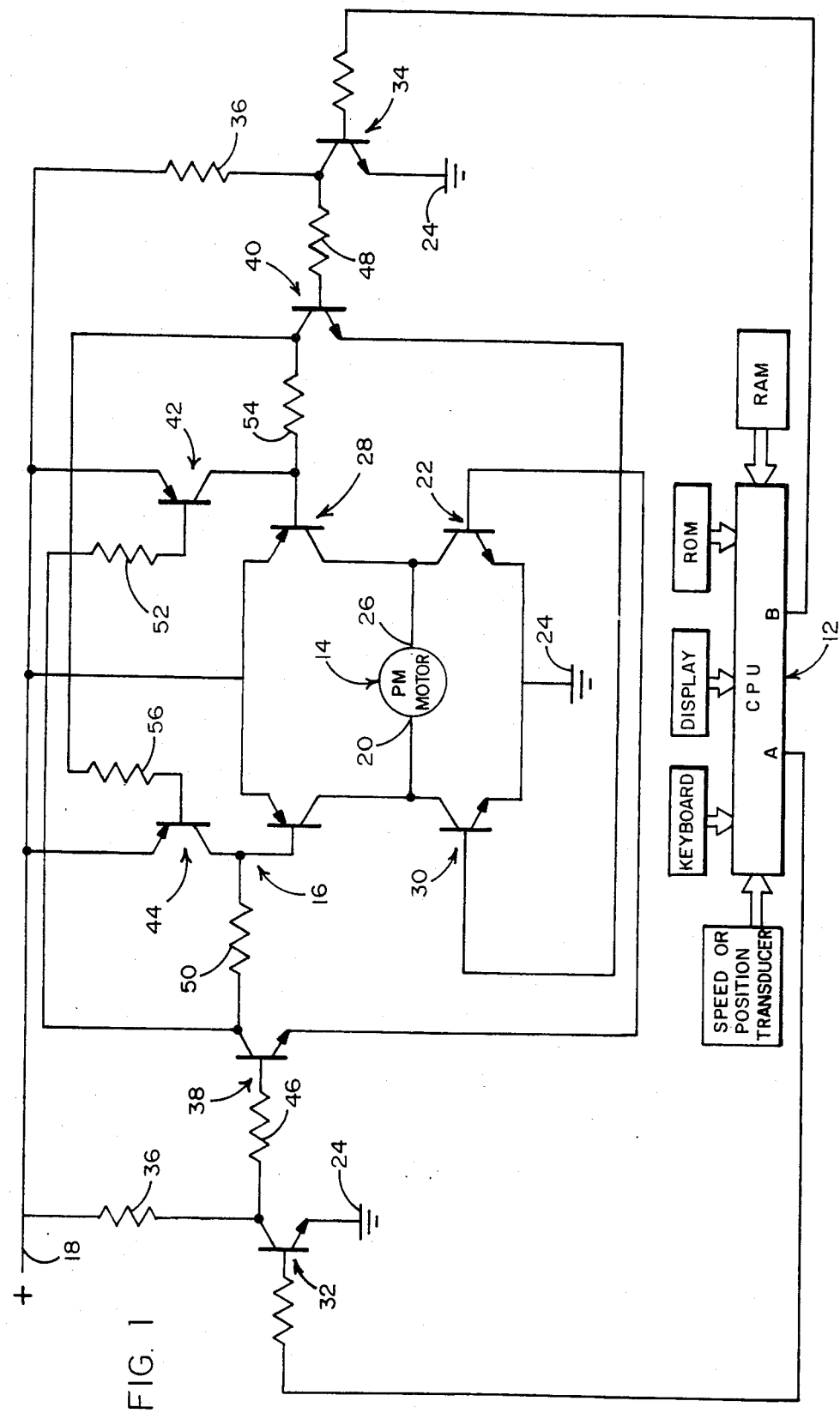
FIG. 1 is a schematic diagram showing in simplified form the signal source, output power motor, and the transistors used in controlling the operations of a motor.

As shown in FIG. 1, a signal source, such as a CPU 12, supplies pulsed, or digital, signals on two output lines, A and B, which are operatively connected to a controlled electric motor 14 in such a way that a "high" logic signal on A accompanied by a "low" logic signal on B will cause the motor to move in one direction, whereas a "high" logic signal on B accompanied by a "low" logic signal on A will cause the motor to move in the opposite direction. By varying the duration of the "on" pulses as a percentage of the total on-off time of the motor 14, the power output of the motor can be varied. In the circuit illustrated, a low logic signal at both A and B will cause dynamic braking of the motor, whereas a high logic signal at both A and B will cause the motor to be turned off, but free to coast. The motor 14 is preferably a permanent magnet DC motor.

Motor 14 is driven in one direction when: (a) transistor 16 is "on", providing emitter-collector current flow through transistor 16 between positive voltage reference 18 and motor terminal 20; and (b) transistor 22 is "on", providing emitter-collector current flow through transistor 22 between negative voltage reference 24 and motor terminal 26. Preferably, transistors 16 and 22 are a complementary pair, i.e., one is a PNP transistor (16 in the drawings) and the other is an NPN transistor (22 in the drawings), and they have substantially the same voltage and gain characteristics, and "turn on" and "turn off" times.

Motor 14 is driven in the opposite direction when: (a) transistor 28 is "on", providing emitter-collector current flow through transistor 28 between positive voltage reference 18 and motor terminal 26; and (b) transistor 30 is "on", providing emitter-collector current flow through transistor 30 between negative voltage reference 24 and motor terminal 20. Preferably, transistors 28 and 30 are also a complementary pair, 28 being shown as a PNP device and 30 as an NPN device. It is normally desirable that all four motor-connected transistors—16, 22, 28 and 30—have matched operating characteristics.

One of the unique and advantageous features of the invention is that only five transistors are required to operate the motor in each direction, beginning with logic level input and ending with sufficient power to provide substantial driving energy. In addition to its switching functions, each branch comprising five transistors is designed to have a power amplification of approximately 18,000 to 1. The input power level is approximately 2.5 milliwatts, based on a logic level voltage of 5 volts and a current of 0.5 milliampere. The output transistors—16, 22, 28 and 30—in order to have a substantial safety factor in their power handling capabilities, may have an available power capacity of 90 watts, based on a 30 volt source and a maximum 3 ampere current. However, the circuit is designed to output about half that power—45 watts—at the power amplification ratio of 18,000.

The A input signal is connected to the base of a transistor 32, and the B input signal is connected to the base of a transistor 34. The transistors 32 and 34, which are shown as NPN devices, each have their collectors connected through resistances 36 to the positive reference voltage 18, and their emitters connected to the negative reference voltage 24. Thus transistors 32 and 34 convert the logic level input voltage swing of approximately 5 volts to the output voltage swing of the power source which may have a value of approximately 30 volts. The transistors 32 and 34, in addition to their amplification function, constitute inverting switches, each of which turns on and off the next transistor in its branch of the control system.

A transistor 38 is switched on and off by transistor 32; and a transistor 40 is switched on and off by transistor 34. Transistors 38 and 40, which are shown as NPN devices, are important multi-purpose devices in this invention, since each of them simultaneously controls pair 16-22 or 28-30 of the motor-connected transistors, and also operates one of two lockout transistors 42 or 44. Transistor 38 has its base connected through a resistance 46 to the collector of transistor 32; and transistor 40 has its base connected through a resistance 48 to the collector of transistor 34. The emitter of transistor 38 is connected to the base of transistor 22; and its collector is connected through a resistance 50 to the base of transistor 16, and also in parallel through a resistance 52 to the base of transistor 42, which is a PNP device. Transistor 40, which has the same functions as transistor 38, but in the opposite branch of the control circuit, has its emitter connected to the base of transistor 30; and its collector is connected through a resistance 54 to the base of transistor 28, and also in parallel through a resistance 56 to the base of transistor 44, which is a PNP device.

Each of the lockout transistors 42 and 44 has its emitter connected to the positive reference voltage. The collector of transistor 42 is connected to the base of transistor 28; and the collector of transistor 44 is connected to the base of transistor 16.

In analyzing operation of the circuit, first assume a 1 (logic high) signal input at A and a 0 (logic low) signal input at B. The high A input at the base of transistor 32 will cause that transistor to be turned on, providing emitter-collector current flow, and dropping its collector voltage signal to low. This low signal at the base of transistor 38 will cause that transistor to be turned off. With no current flowing in transistor 38, its collector voltage will be high, causing PNP transistors 16 and 42 to be turned off, and its emitter voltage will be low, causing NPN transistor 22 to be turned off.

The low B input at the base of transistor 34 will cause that transistor to be turned off, preventing emitter-collector current flow, and raising its collector voltage signal to high. This high signal at the base of transistor 40 will cause that transistor to be turned on. The flow of emitter-collector current in transistor 40 will close a series circuit between negative voltage reference 24 and positive voltage reference 18, in which emitter-base current flows in NPN transistor 30, causing that transistor to be turned on, and base-emitter current flows in PNP transistor 28, causing that transistor also to be turned on.

Motor 14 will now be driven in one direction by the current flowing between its terminals 20 and 26, terminal 20 being connected to low voltage reference 24 through transistor 30, and terminal 26 being connected to high voltage reference 18 through transistor 28.

The current flow in transistor 40, and the resulting voltage drop at its collector, puts a low level input signal on the base of PNP transistor 44, causing it to be turned on. Transistor 44, and its counterpart transistor 42, are designed to be driven to saturation at a very low input level (less than the inherent transistor voltage drop), thus ensuring that the full voltage of the high reference voltage 18 will be connected to the base of transistor 16. This creates a lockout, providing positive assurance that transistor 16 will not be turned on while transistor 30 is turned on. The full voltage at the base of transistor 16 will hold it in the off state, regardless of the signal input to transistor 16 from transistor 38. Clearly, any simultaneous turn on of transistors 16 and 30, or of their counterparts 22 and 28, would be destructive, because a short circuit would be created between the positive reference voltage 18 and the negative reference voltage 24.

Since the motor control system is symmetrical, the two branches operate in exactly the same way, but their operation is reversed when the motor is driven in the opposite direction. If the signal at A is 0 (logic low) and the signal at B is 1 (logic high), transistor 32 will be caused to turn off, and transistor 34 will be caused to turn on. The high voltage signal at the collector of transistor 32 will cause transistor 38 to turn on, thus providing a series current from the low voltage reference 24 through the emitter-base of NPN transistor 22 and through the base-emitter of PNP transistor 16. With both transistors 22 and 16 turned on, terminal 26 of motor 14 will be connected to low voltage reference 24, and its terminal 20 will be connected to high voltage reference 18. The motor will be driven in the opposite direction from its motion when the A and B signals are reversed. The low voltage signal at the collector of transistor 38 will turn on the NPN lockout transistor 42. This places full positive voltage at the base of transistor 28, preventing it from being turned on.

In referring to the functions of the five transistors in each branch of the circuit, it may be useful to designate the transistors 32 and 34 as "input" devices, the transistors 38 and 40 as "control" devices (because each of them actuates three other transistors), the transistors 42 and 44 as "lockout" devices, and the transistors 16, 22, 28 and 30 as "motor-drive", or "power", devices.

A valuable aspect of the invention is the series connection of the gate circuits of the motor drive transistor pairs. Because the paired transistors 16–22 and 28–30 are matched PNP and NPN devices having their gate currents in series, they are ensured of being turned on to the same degree, thus avoiding any wasting of available motor driving power.

While the control circuit of the present invention is useful whenever it is desired to control bi-directional motion with a minimum number of transistors, it is particularly impressive in its ability to provide bi-directional power output control directly from logic level input signals, using a total of only ten transistors. The use of each control device to operate the two power devices and also the lockout device is a significant contributor to the functional and economical advantages of this circuit.

The motor 14 is turned off, but free to coast, if both A and B have input signals of 1 (logic high). This causes both control transistors 38 and 40 to be turned off, and all of the motor drive transistors 16, 22, 28 and 30 to be turned off. In this condition, the motor is able to coast without any braking effect resulting from the current generated by the motor.

In the disclosed circuit, dynamic braking occurs if both A and B have input signals of 0 (logic low). There are some situations where dynamic braking would not be desirable; and the circuit should be altered for that reason. However, the circuit shown is designed to provide dynamic braking. With both A and B input signals low, transistors 32 and 34 are turned off, causing their collector voltage to go high, providing a high signal at the bases of transistors 38 and 40, thus causing them to turn on. The effect is to turn on drive transistors 22 and 30, and also to turn on lockout transistors 42 and 44, which prevent drive transistors 16 and 28 from turning on. Transistors 22 and 30 provide a shunt for the motor armature, i.e., a parallel path for the current generated by the BEMF of the moving motor (assuming that such motion has been occurring). Since these transistors are power transistors, the effect is to operate one as a transistor and the other 15 as a diode, their roles depending on the motor's direction of movement, and the polarity of its BEMF-generated current. Dynamic braking is caused by this low resistance shunting because the coasting of the permanent magnet motor acts as a generator with a low impedance load.

Figure 2:
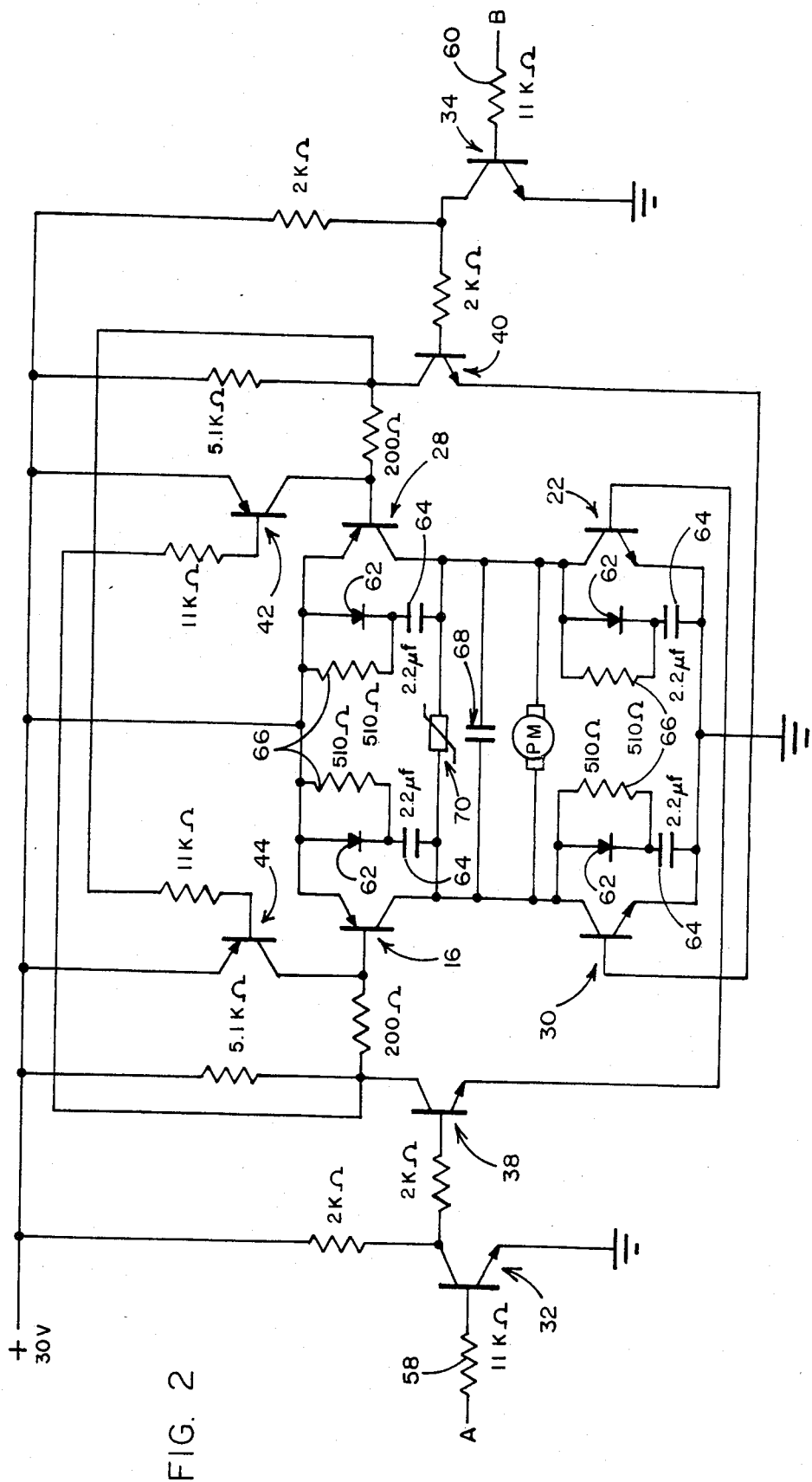
FIG. 2 is a more detailed showing of the same motor control circuit as that shown in FIG. 1.

FIG. 2 shows essentially the same motor actuating circuit as FIG. 1, except that "snubber" circuits are included for the four motor drive transistors 16, 22, 28 and 30, and specific resistor values are shown as an example of a practical embodiment of the circuit. Obviously, these values are merely exemplary, and may be varied in accordance with the design parameters of a given system. In FIG. 2, the same identifying numerals are used where the elements correspond to those in FIG. 1. The resistor values are applicable to a circuit in which: (a) the NPN input transistors 32 and 34 are signal level transistors, which may be Motorola MPS series devices designated A 05; (b) the NPN control and drive transistors 22, 30, 38 and 40 are power level transistors, which may be the type designated TIP 31; (c) the PNP drive transistors 16 and 28 are power level transistors, which may be the type designated TIP 32; and (d) the PNP lockout transistors 42 and 44 are power level transistors, which may be Motorola MPS series devices designated A 55.

Between input line A and the base of transistor 32, there is a resistor 58; and between input line B and the base of transistor 34, there is a resistor 60. The resistors 58 and 60 are shown having a value of 11 kilohms. A relatively high value of these resistors is needed to provide a high impedance input, thus minimizing the current demanded from the logic portion of the system. The other resistance values are generally dictated by the amplification requirements and the types of transistors chosen for the circuit. As previously stated, the devices and resistance values are chosen to cause switch mode operation, i.e., rapid change between cut-off and saturation at the leading, or trailing, edge of each input pulse.

The load shifting circuitry (also termed "snubber", or "dump" circuitry) associated with each of the motor drive transistors (16, 22, 28, 30) comprises a diode 62 and a capacitor 64 in series, in a branch parallel to the respective transistor, and a resistor 66 shunting diode 62. The diodes may be the type identified as 1N 5402, and the resistors and capacitors may have the values shown in FIG. 2. The effect of the load shifting circuit is to charge the capacitor 64 through diode 62 during transistor turn-off, thus diverting current from the transistor. When the transistor is next turned on the capacitor will discharge through resistor 66. The effect of these load shifting circuits is to limit the peak transistor currents, thereby permitting each drive transistor to safely switch more power than it could without such protection.

As shown in FIG. 2, the motor 14 is shunted through a capacitor 68 to bypass voltage transients, and is also shunted through a metal oxide varistor 70, which acts as a voltage-dependent resistance to limit peak voltages to a level below the 80 V peak reverse voltage rating of the motor drive transistors.

It would be possible to substitute field effect transistors for the junction transistors shown, but such a change would result in greater power loss. As previously stated, low power loss is an important advantage of the present invention. It permits a maximum percentage of the available power to be used in driving the motor. rather than operating the transistors. In the off state, the only current flowing is that in the signal level input transistors 32 and 34. In the one state, power loss is reduced by operating the motor with a minimum number of transistors.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. In a bi-directional electric motor actuating system having (a) high and low reference voltages, (b) two motor terminals for selective connection to the high and low reference voltages, and (c) two signal input sources each providing high or low level logic pulses, an electronic control circuit comprising:
- a first group of transistors which receives its input signal from one of the signal input sources; and
- a second group of transistors which receives its input signal from the other signal input source;

each group of transistors including:
- a first motor drive transistor which, when turned on, provides a closed circuit from one motor terminal to the high reference voltage;
- a second motor drive transistor which, when turned on, provides a closed circuit from the other motor terminal to the low reference voltage;
- a lockout transistor which has its output connected to the input of one of the motor drive transistors in the other group of transistors; and
- a control transistor receiving an input signal controlled by one of the two signal input sources;
- the output of the control transistor producing the input signal to both the first and second motor drive transistors, whereby actuation of the control transistor simultaneously turns on both of said motor drive transistors; and
- the output of the control transistor having a parallel connection to the input of the lockout transistor, whereby actuation of the control transistor causes the output signal of the lockout transistor to turn off the motor drive transistor with the result that the turning on of the first and second motor drive transistors and the prevention of turning on of one of the motor drive transistors in the other group are automatically coordinated by a single control transistor.

2. The motor actuating system of claim 1 in which all of the transistors are operated in the saturation region, thereby combining switching and amplifying functions.

3. The motor actuating system of claim 2 in which variations in motor driving energy are controlled solely by the relative on and off periods of the signal input pulses.

4. The motor actuating system of claim 1 in which each group of transistors also includes:
- an input transistor which receives signals from one of the two signal input sources, and which causes the control transistor to be actuated or not depending on the high or low level logic pulses it receives.

5. The motor actuating system of claim 4 in which each transistor group consists solely of the five identified transistors between the logic level input and the motor drive power output.

6. The motor actuating system of claim 3 in which each group of transistors also includes:
- an input transistor which receives signals from one of the two signal input sources, and which causes the control transistor to be actuated or not depending on the high or low level logic pulses it receives.

7. The motor actuating system of claim 6 in which each transistor group consists solely of the five identified transistors between the logic level input and the motor drive power output.

8. The motor actuating system of claim 1 in which:
- the transistors are junction transistors each connected in the common-emitter configuration;
- the first and second motor drive transistor in each group are a matched PNP and NPN pair; and
- the bases of the PNP and NPN pair of motor drive transistors receive their inputs, respectively, from the collector and the emitter of their control transistor.

9. The motor actuating system of claim 8 in which:
- the lockout transistor has its base receiving an input from the collector of the control transistor, and its emitter-collector circuit providing a connection between a reference voltage and the base of the motor drive transistor to which it is operatively connected.

10. The motor actuating system of claim 1 wherein:
- the electric motor is a permanent magnet motor; and
- simultaneous actuation of the control transistors in both groups of transistors causes shunting of the motor armature through the motor drive transistors in each group which are not operatively connected to the respective lockout transistors, such shunting providing dynamic braking of the motor.

11. In a bi-directional electric motor operating system which is operated by a low power digital control unit, and which has: (a) high and low reference voltages, and (b) two motor terminals for selective connection to the high and low reference voltages; an electronic control circuit comprising:
- two signal sources directly connected to the digital control unit and arranged to provide high or low level logic signal output pulses having the voltage and power characteristics of the digital control unit;
- a first group of motor-operating transistors which receives the signal output pulses of one of the signal courses; and
- a second group of motor-operating transistors which receives the signal output pulses of the other signal (input) source;

each group of motor-operating transistors consisting solely of:
- a first motor drive transistor which, whenn turned on, provides a closed circuit from one motor terminal to the high reference voltage;
- a second motor drive transistor which, when turned on, provides a closed circuit from the other motor terminal to the low reference voltage;
- the first and second motor drive transistors being a matched pair of junction transistors, one of which is PNP and the other of which is NPN;
- an input transistor whose base receives the logic signal output pulses of the respective signal source;
- a control transistor having its base receiving the output signal of the input transistor, and having its collector and emitter connected, respectively, to the bases of the first and second motor drive transistors, thereby causing a series circuit to flow in the base-emitter currents of the first and second motor drive transistors whenever their control transistor is turned on; and
- a lookout transistor having its base connected in parallel to the emitter of the control transistor, and having its output connected to the base of one of the motor drive transistors in the other group, whereby the control transistor, as it turns on the first and second motor drive transistors, also causes the lockout transistor to prevent turning on of the motor drive transistor to whose base its output is connected.

12. The motor-operating system of claim 11 in which the voltage difference between the high and low level pulses of each signal source is not substantially greater than 5 volts.

13. The motor-operating system of claim 11 in which the power output of the digital control unit to the respective signal sources is not substantially greater than 2.5 milliwatts.

14. The motor-operating system of claim 12 in which the power output of the digital control unit to the respective signal sources is not substantially greater than 2.5 milliwatts.

* * * * *